Patented Nov. 11, 1952

2,617,840

UNITED STATES PATENT OFFICE 2,617,840

PROCESS FOR FROTHING RUBBER LATEX

Charles F. Eckert, Westwood, N. J., assignor to United States Rubber Company, New York, N. Y., a corporation of New Jersey No Drawing. Application June 10, 1950, Serial No. 167,494

8 Claims. (Cl. 260—723)

This invention relates to the manufacture of sponge rubber from latex, and more particularly to the manufacture of sponge rubber by frothing the latex by the decomposition of hydrogen peroxide in the latex.

The evolution of oxygen by the decomposition of hydrogen peroxide, with the aid of a decomposition catalyst, in latex as a means of foaming the latex in the preparation of sponge rubber is known. The froth or foam thus produced may be made to coagulate or gel on standing, or on heating, by the addition of known gelling agents, such as alkali-metal silicofluorides, or it may be coagulated by freezing, with or without the addition of a coagulant, in known manner. The general procedure followed in the preparation of latex sponge by hydrogen peroxide decomposition is to thoroughly intermix in a latex the usual compounding ingredients, such as curatives, accelerators, and antioxidants, and add to this mixture the hydrogen peroxide and catalyst for its decomposition. It is essential, in order to insure even blowing of the sponge, that the hydrogen peroxide and catalyst be thoroughly intermixed in the latex. This is, however, very difficult to do because invariably when the hydrogen peroxide and catalyst come into contact in the latex, the hydrogen peroxide commences to decompose very rapidly, frothing the latex to such a degree that further intermixing of the hydrogen peroxide and catalyst in the latex, in order to insure a uniform, porous structure upon completion of blowing, is impossible because of the great increase in volume and viscosity of the latex. In addition, due to this rapid initial frothing, it is frequently impossible to carry out the often desirable operating procedure of pouring the latex into a mold, so that in frothing it will take the shape of the mold. In order to obtain a homogeneous dispersion of the blowing agent and catalyst in the latex with conventional mixing apparatus, one-half minute to one minute of mixing is necessary. For most purposes an additional half minute to a minute, after intermixing is complete but before rapid frothing occurs, is desirable so that the slowly frothing latex may be poured into a mold. This rapid initial decomposition of the hydrogen peroxide is especially evident when catalysts such as the various catalases, e. g., those found in yeast, beef or other animal liver, are used to speed up the decomposition of the hydrogen peroxide.

The object of the present invention is to slow down the initial rate of decomposition of hydrogen peroxide with catalase decomposition catalyst in latex in the manufacture of sponge rubber without appreciably reducing the amount of oxygen evolved or the blowing that takes place in the sponge, as measured by the total volume increase in the latex on foaming.

According to the present invention, latex is foamed by the catalase catalyzed decomposition of hydrogen peroxide in the presence of a small amount of hydroxylamine which acts as a catalyst retarder and slows down the initial decomposition rate of the hydrogen peroxide.

In carrying out the present invention, the hydrogen peroxide, catalase and hydroxylamine may be added to a latex which is at room temperature or to a latex that has been cooled to $0°$ to $15°$ C., which cooling still further slows down the initial decomposition rate of the hydrogen peroxide. The hydroxylamine is preferably added to the latex in an aqueous medium similarly to the hydrogen peroxide and catalase, and preferably is in the form of a salt, such as hydroxylamine hydrochloride or hydroxylamine sulfate. The aqueous hydroxylamine may be added to the latex, or may be intermixed with the catalase and then added to the latex. It is only important not to bring the hydrogen peroxide and catalase together in the latex unless the hydroxylamine is present.

The amount of hydrogen peroxide for decomposition of the latex is that conventionally used for frothing latex, viz., 1 to 7 parts by weight of hydrogen peroxide ($H_2O_2$) per 100 parts of rubber of the latex depending on the density desired in the final product. The amount of catalase to give satisfactory activation of the hydrogen peroxide will be a catalytic amount as commonly used for the purpose, generally from 5 to 20 percent of the weight of the hydrogen peroxide ($H_2O_2$). The amount of hydroxylamine to be used depends on the rate of hydrogen peroxide decomposition desired, and on the nature of the catalase, which may be obtained from yeast or from the liver of various animals. Large amounts of hydroxylamine poison the catalases, and lesser amounts will cause too slow a decomposition reaction. The amount of hydroxylamine will be a catalyst retarding amount, and preferably should be only such amount as to give the maximum rate of blowing that can be tolerated in the particular foaming and molding operation under consideration. The amount of hydroxylamine generally will be less than 1% of the weight of the catalase, and may be as low as 0.01% by weight of the catalase.

The following examples are illustrative of the invention, all parts and percentages referred to therein being by weight:

Example I

An ammonia preserved natural rubber (once creamed) latex of 68% solids concentration was deammoniated by blowing air therethrough, and was compounded according to the following formulation, compounding ingredients being added as conventional aqueous solutions and pastes:

|  | Parts by weight | |
| --- | --- | --- |
|  | Dry Basis | Wet Basis |
| Latex | | 147 |
| 20% aqueous potassium oleate | 1 | 5 |
| Curing paste: | | |
| Sulfur | 2.5 | |
| Zinc oxide | 5. | |
| Zinc diethyl dithiocarbamate | 0.65 | 16 |
| Zinc salt of 2-mercaptobenzothiazole | 1.25 | |
| Dispersing agents | 0.2 | |
| Water | 6.4 | |
| Antioxidant paste: | | |
| Antioxidant | 0.5 | |
| Dispersing agent | 0.42 | 1 |
| Water | 0.48 | |

To a portion of the latex at 30° C., there was added with stirring 0.34 part of catalase in a 5% aqueous suspension, and 4 parts of hydrogen peroxide ($H_2O_2$) in a 30% aqueous solution per 100 parts of rubber of the latex compound. The same amounts of catalase and hydrogen peroxide were added to a second portion but in this case 0.000135 part of hydroxylamine (per 100 parts of rubber) as a 0.007% aqueous solution of hydroxylamine hydrochloride was added after the catalase and before the hydrogen peroxide. The same amounts of catalase and hydrogen peroxide were added to a third portion but in this case 0.00031 part of hydroxylamine (per 100 parts of rubber) as a 0.007% aqueous solution of hydroxylamine hydrochloride was added after the catalase and before the hydrogen peroxide. The time which elapsed after the hydrogen peroxide addition before the frothing latex attained a volume of twice the original liquid latex was 4 seconds in the first portion, 7 seconds in the second portion, and 34 seconds in the third portion. The time which elapsed before the volume of froth was three times the original latex volume was 8 seconds in the first portion, 23 seconds in the second portion, and 67 seconds in the third portion. The time which elapsed before the volume of froth was five times the original latex volume was 18 seconds in the first portion, 60 seconds in the second portion, and 110 seconds in the third portion. The time which elapsed before the volume of froth was eight times the original latex volume was 64 seconds in the first portion, 117 seconds in the second portion, and 188 seconds in the third portion.

It is evident from these results that by the inclusion of hydroxylamine, the initial decomposition of the hydrogen peroxide is made to proceed at a sufficiently slower rate to give adequate time for the necessary manipulative operations before completion of the blowing.

Example II

The latex used was the same as Example I. In this case the latex was cooled to 5° C. To one portion of the cooled latex was added the same 0.34 part of catalase and 4 parts of hydrogen peroxide as in Example I. To a second portion of the cooled latex was added these same amounts of catalase and hydrogen peroxide but with the addition of 0.000135 part of hydroxylamine similarly to the second portion in Example I prior to the hydrogen peroxide addition. The time to double the volume of the first portion was 12 seconds, and of the second portion 61 seconds. The time to triple the volume of the first portion was 30 seconds, and the second portions 130 seconds. The time which elapsed before the volume of froth was five times the original latex volume was 62 seconds in the first portion, and 192 seconds in the second portion. The time which elapsed before the volume of froth was eight times the original latex volume was 98 seconds in the first portion, and 249 seconds in the second portion.

The hydroxylamine reduced the initial decomposition rate of the hydrogen peroxide in the cooled latex as shown in the above. Comparing the above results with those in the first example, it is seen that the cooling alone results in a slower initial decomposition rate but that the increased delay achieved with the hydroxylamine where 0.00031 parts was added in Example I, is longer than that resulting from the cooling alone, as in the first portion in Example II.

Example III

An ammonia preserved natural rubber (once centrifuged, twice creamed) latex of 58.2% solids concentration was deammoniated by blowing air therethrough, and additionally stabilized with 20 parts (wet) of 10% aqueous solution of dimethylamine caseinate per 100 parts of solids of the latex. The latex was compounded according to the following formulation, the compounding ingredients being added as aqueous solutions or pastes:

|  | Parts by weight | |
| --- | --- | --- |
|  | Dry Basis | Wet Basis |
| Latex | | 172 |
| 20% aqueous stabilizer solution (reaction product of ethylene oxide and isopropyl phenol) | 1 | 5 |
| Curing paste: | | |
| Sulfur | 2.5 | |
| Zinc oxide | 5.0 | |
| Zinc diethyl dithiocarbamate | 0.65 | 16 |
| Zinc salt of 2-mercaptobenzothiazole | 1.25 | |
| Dispersing agents | 0.2 | |
| Water | 6.4 | |
| Antioxidant paste: | | |
| Antioxidant | 0.5 | |
| Dispersing agent | 0.02 | 1 |
| Water | 0.48 | |
| 5% of aqueous methyl cellulose (thickener) | 0.5 | 10 |

Forty ml. (millilitres) of 30% hydrogen peroxide were then stirred into 816 grams (four formula weights) of the above compounded latex. When the hydrogen peroxide was evenly dispersed throughout the latex, 40 ml. of a 2% aqueous catalase solution and 16 ml. of a 0.0039% aqueous solution of hydroxylamine hydrochloride were intermixed and added to the latex with vigorous stirring. Stirring was continued for about one minute; during this period the latex slowly frothed to double its original volume. It was then poured into a mold. Frothing became rapid almost immediately after pouring. After frothing was complete the porous latex was coagulated by freezing at −60° C. for 45 minutes. The coagulated latex was then cured by placing it under atmospheric steam for one-half hour.

The resultant cured sponge had a density of .157 g./cc., and a good structure.

The latex for preparing sponge rubber according to the present invention may be a natural rubber latex, as in the illustrative examples above, or a conjugated diolefine polymer synthetic rubber latex, or mixtures of any of the same. Such conjugated diolefine polymer synthetic rubber latex may be an aqueous emulsion polymerizate of one or a mixture of butadienes-1,3, for example, butadiene-1,3, 2-methyl-butadiene-1,3 (isoprene), 2-chloro-butadiene-1,3 (chloroprene), piperylene, 2,3-dimethyl-butadiene-1,3. The conjugated diolefine polymer synthetic rubber latex, as known, may be made from a mixture of one or more of such butadienes-1,3 with one or more other polymerizable compounds which are capable of forming rubbery copolymers with butadienes-1,3, for example, up to 70% of such mixture of one or more compounds which contain a single $CH_2=C<$ group where at least one of the disconnected valences is attached to an electronegative group, that is, a group which substantially increases the electrical dissymmetry or polar character of the molecule. Examples of compounds which contain a $CH_2=C<$ group and are copolymerizable with butadienes-1,3 are aryl olefines, such as styrene, and vinyl naphthalene; the alpha-methylene carboxylic acids, and their esters, nitriles and amides, such as acrylic acid, methyl acrylate, methyl methacrylate, acrylonitrile, methacrylonitrile, methacrylamide; methyl vinyl ether; methyl vinyl ketone; vinylidene chloride.

In view of the many changes and modifications that may be made without departing from the principles underlying the invention, reference should be made to the appended claims for an understanding of the scope of the invention.

Having thus described my invention what I claim and desire to protect by Letters Patent is:

1. The process of frothing latex selected from the group consisting of ammonia preserved natural rubber latex and conjugated diolefine polymer synthetic rubber latex by the evolution of oxygen in the latex which comprises incorporating in the latex at a temperature between 0° C. and 30° C. hydrogen peroxide and catalase decomposition catalyst for the hydrogen peroxide, and hydroxylamine in small quantity effective to retard the catalyst activity of the catalase and to slow down the initial rate of the hydrogen peroxide decomposition.

2. The process of frothing latex selected from the group consisting of ammonia preserved natural rubber latex and conjugated diolefine polymer synthetic rubber latex by the evolution of oxygen in the latex which comprises incorporating in the latex at a temperature between 0° C. and 15° C. hydrogen peroxide and catalase decomposition catalyst for the hydrogen peroxide, and hydroxylamine in small quantity effective to retard the catalyst activity of the catalase and to slow down the initial rate of the hydrogen peroxide decomposition.

3. The process of frothing ammonia preserved natural rubber latex by the evolution of oxygen in the latex which comprises incorporating in the latex at a temperature between 0° C. and 30° C. hydrogen peroxide and catalase decomposition catalyst for the hydrogen peroxide, and hydroxylamine in small quantity effective to retard the catalyst activity of the catalase and to slow down the initial rate of the hydrogen peroxide decomposition.

4. The process of frothing ammonia preserved natural rubber latex by the evolution of oxygen in the latex which comprises incorporating in the latex at a temperature between 0° C. and 15° C. hydrogen peroxide and catalase decomposition catalyst for the hydrogen peroxide, and hydroxylamine in small quantity effective to retard the catalyst activity of the catalase and to slow down the initial rate of the hydrogen peroxide decomposition.

5. The process of frothing latex selected from the group consisting of ammonia preserved natural rubber latex and conjugated diolefine polymer synthetic rubber latex by the evolution of oxygen in the latex which comprises incorporating in the latex at a temperature between 0° C. and 30° C. hydrogen peroxide and catalase decomposition catalyst for the hydrogen peroxide, and hydroxylamine in small quantity effective to retard the catalyst activity of the catalase and to slow down the initial rate of the hydrogen peroxide decomposition, the amount of hydrogen peroxide being 1 to 7 parts by weight per 100 parts of rubber of the latex, the amount of catalase being 5 to 20 percent of the weight of the hydrogen peroxide, and the amount of hydroxylamine being 0.01 to 1 percent of the weight of the catalase.

6. The process of frothing latex selected from the group consisting of ammonia preserved natural rubber latex and conjugated diolefine polymer synthetic rubber latex by the evolution of oxygen in the latex which comprises incorporating in the latex at a temperature between 0° C. and 15° C. hydrogen peroxide and catalase decomposition catalyst for the hydrogen peroxide, and hydroxylamine in small quantity effective to retard the catalyst activity of the catalase and to slow down the initial rate of the hydrogen peroxide decomposition, the amount of hydrogen peroxide being 1 to 7 parts by weight per 100 parts of rubber of the latex, the amount of catalase being 5 to 20 percent of the weight of the hydrogen peroxide, and the amount of hydroxylamine being 0.01 to 1 percent of the weight of the catalase.

7. The process of frothing ammonia preserved natural rubber latex by the evolution of oxygen in the latex which comprises incorporating in the latex at a temperature between 0° C. and 30° C. hydrogen peroxide and catalase decomposition catalyst for the hydrogen peroxide, and hydroxylamine in small quantity effective to retard the catalyst activity of the catalase and to slow down the initial rate of the hydrogen peroxide decomposition, the amount of hydrogen peroxide being 1 to 7 parts by weight per 100 parts of rubber of the latex, the amount of catalase being 5 to 20 percent of the weight of the hydrogen peroxide, and the amount of hydroxylamine being 0.01 to 1 percent of the weight of the catalase.

8. The process of frothing ammonia preserved natural rubber latex by the evolution of oxygen in the latex which comprises incorporating in the latex at a temperature between 0° C. and 15° C. hydrogen peroxide and catalase decomposition catalyst for the hydrogen peroxide, and hydroxylamine in small quantity effective to retard the catalyst activity of the catalase and to slow down the initial rate of the hydrogen peroxide decomposition, the amount of hydrogen peroxide being 1 to 7 parts by weight per 100 parts of rubber of the latex, the amount of catalase being 5 to 20 percent of the weight of the of the hydrogen peroxide, and the amount of hydroxylamine being 0.01 to 1 percent of the weight of the catalase.

CHARLES F. ECKERT.

REFERENCES CITED

The following references are of record in the file of this patent:

UNITED STATES PATENTS

| Number | Name | Date |
|---|---|---|
| 2,126,268 | McGavack | Aug. 9, 1938 |
| 2,138,081 | Wolf | Nov. 29, 1938 |
| 2,432,353 | Talalay | Dec. 9, 1947 |
| 2,540,040 | Baker | Jan. 30, 1951 |